Patented Oct. 3, 1922.

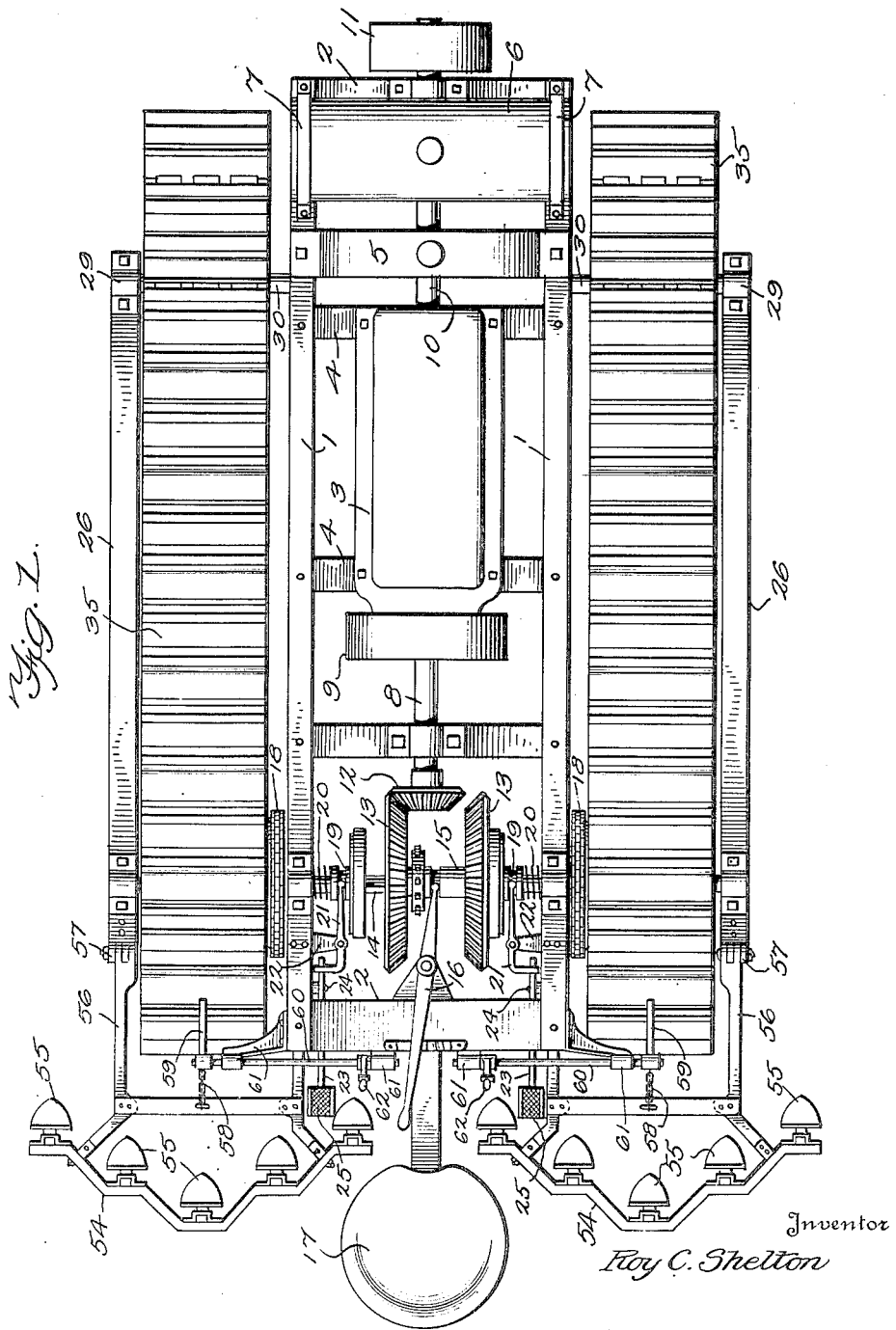

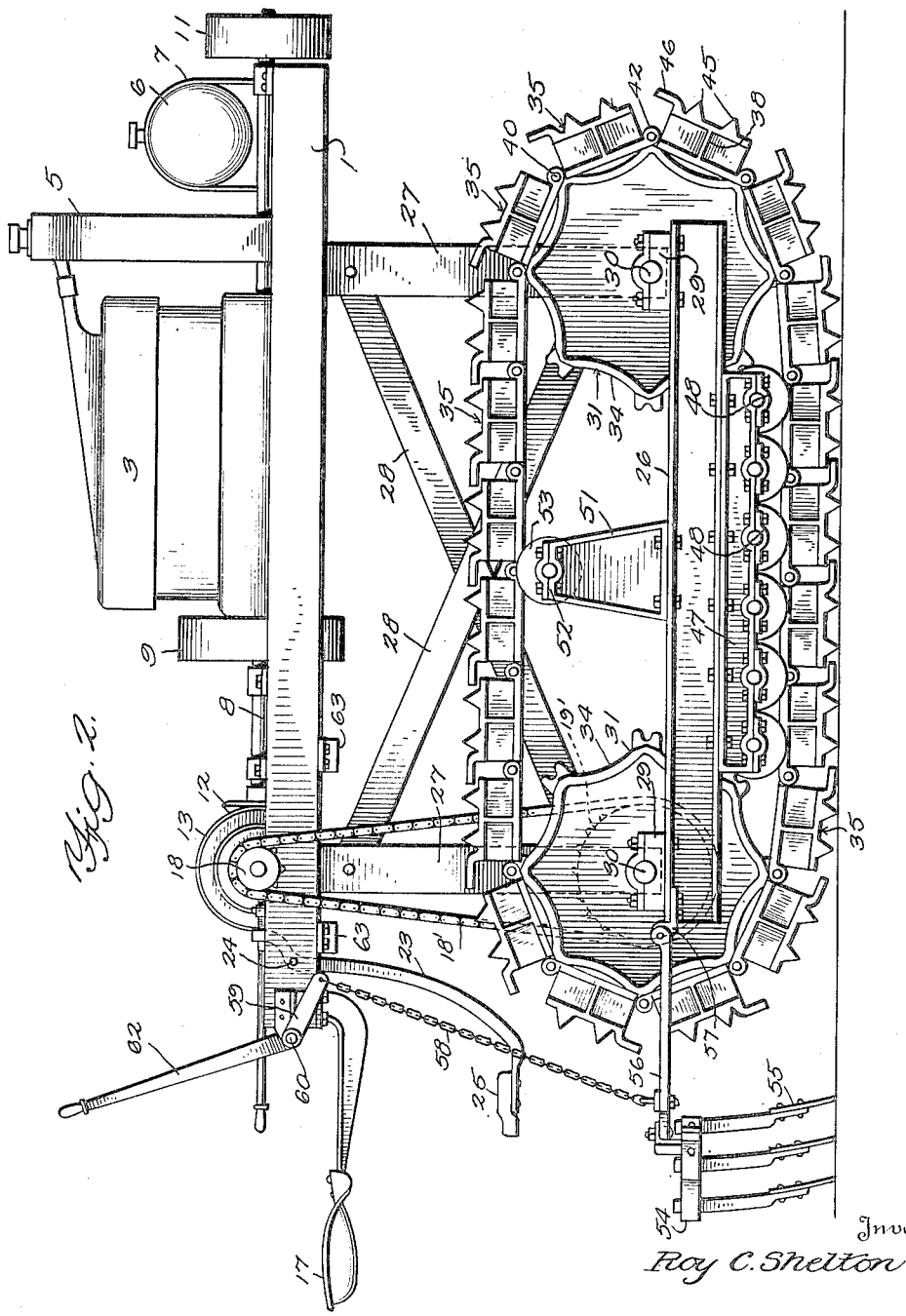

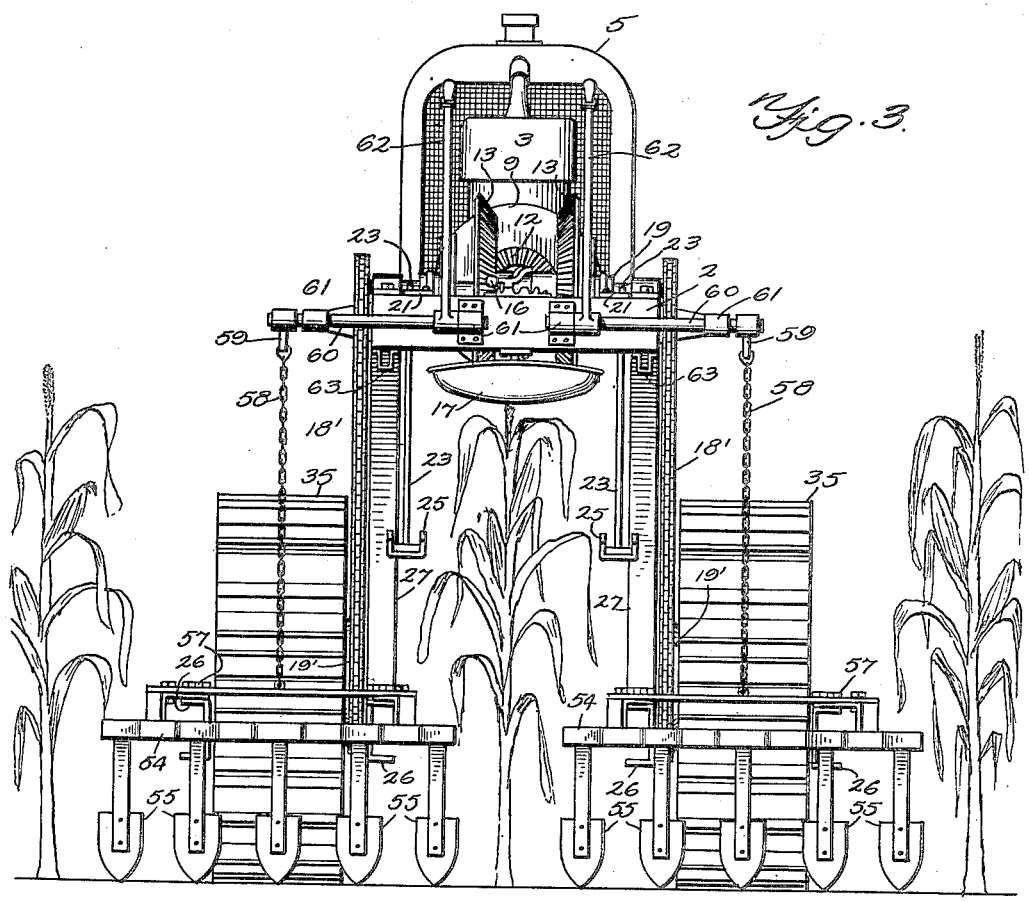
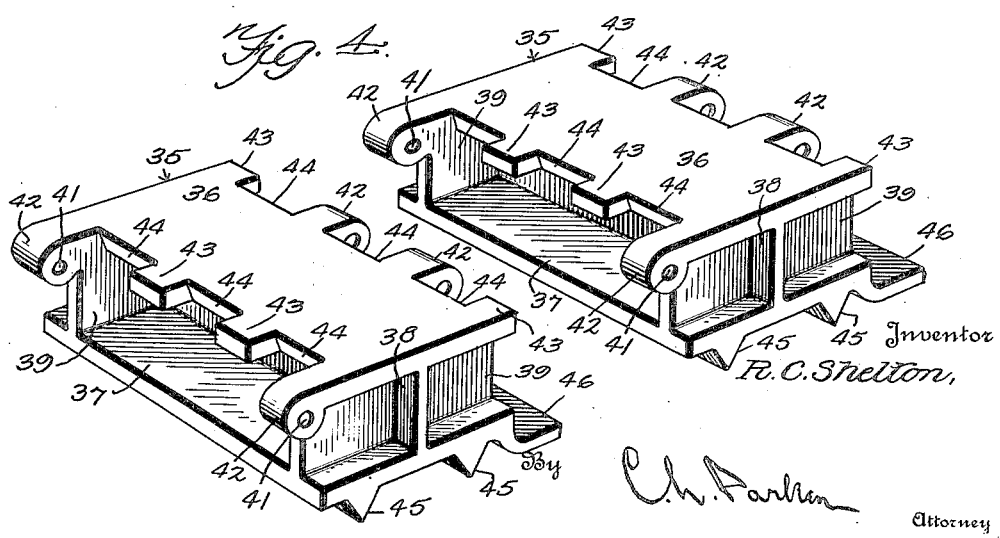

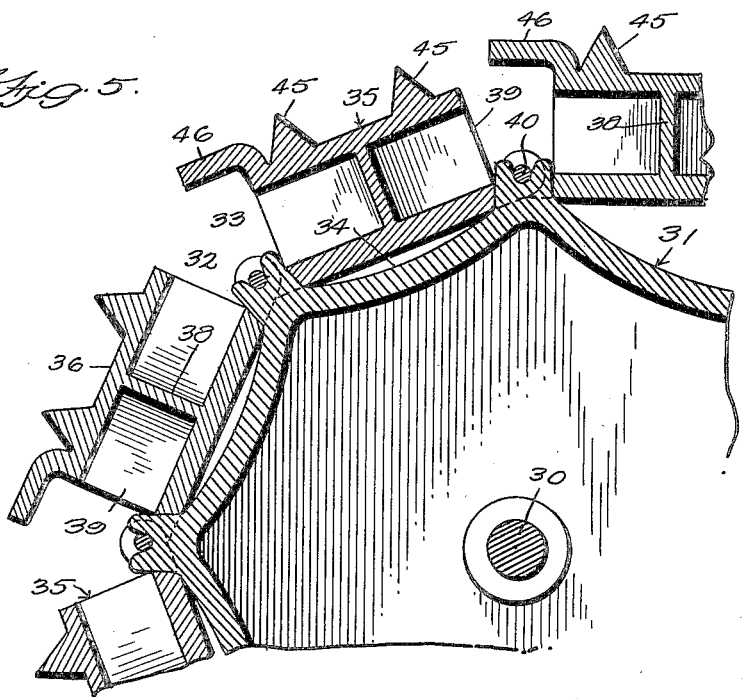
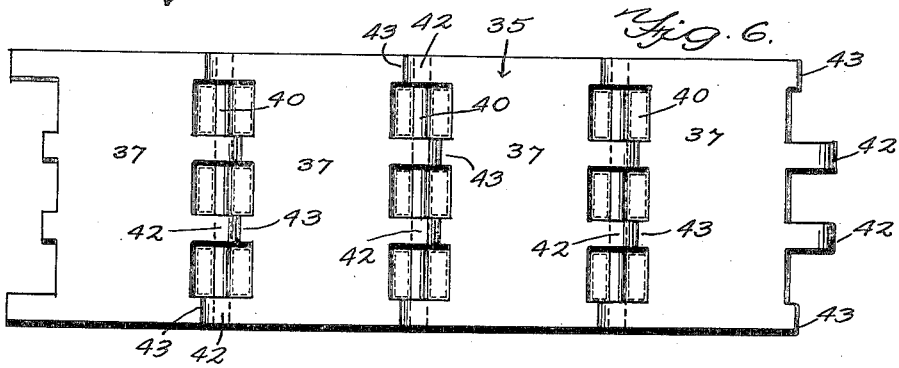
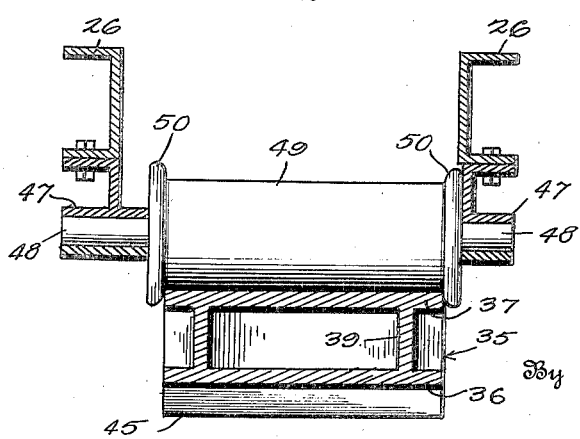

1,430,693

UNITED STATES PATENT OFFICE.

ROY C. SHELTON, OF NASHVILLE, TENNESSEE.

TRACTOR.

Application filed January 29, 1921, Serial No. 440,904. Renewed August 14, 1922. Serial No. 581,838.

*To all whom it may concern:*

Be it known that I, ROY C. SHELTON, a citizen of the United States, residing at Nashville, in the county of Davidson and State of Tennessee, have invented certain new and useful Improvements in Tractors, of which the following is a specification.

This invention relates to tractors for use in agricultural work, and it comprises a frame having a traction element mounted on each side, the frame being arranged at a suitable elevation to permit it to straddle rows of growing vegetables, each of said traction elements comprising a frame, a wheel arranged at each end thereof, an endless belt or chain passing over said wheels, said chain comprising a plurality of ground engaging elements pivotally connected to each other and provided with cut-out portions for engaging teeth or projections formed on said wheels, and a tread member spaced from said pivots to protect the pivots from dirt, sand and other foreign material.

In the present invention, I have provided a tractor which may be employed in connection with cultivators and other types of agricultural implements, wherein the main frame carrying the motor or drive mechanism, is mounted at a substantial elevation to permit it to clear corn and other vegetables when at their full growth, the main frame being provided with depending members on each side connected to auxiliary frames, or traction frames, which carry the traction elements and which are disposed in the spaces between the rows.

Each of the traction frames is provided with a wheel at each end adapted to engage the traction member, the wheel having projections or lugs serving as sprockets. The traction element consists of a plurality of members of a substantial thickness, the outer faces of which are adapted to engage the ground, and the inner faces of which are provided with openings for the reception of a pivot pin. Suitable recesses or cut-out portions are arranged in the adjacent ends of the inner faces of the traction elements adapted to receive the projections formed on the wheels.

In the accompanying drawings, I have shown one embodiment of the invention. In this showing:

Figure 1 is a plan view,

Figure 2 is a side elevation,

Figure 3 is a rear elevation,

Figure 4 is a detailed perspective view of the traction elements,

Figure 5 is a detailed sectional view through one of the wheels showing the traction elements in position, Figure 6 is a plan view of the inner face of the traction elements, and, Figure 7 is a transverse sectional view showing idler rollers employed on the traction frame.

Referring to the drawings, the reference numeral 1 designates the longitudinal members of the main frame, which are connected to each other by transverse members 2. Any suitable drive mechanism may be employed. In the drawings, I have shown an internal combustion engine 3, mounted on the frame in any suitable manner, as by transverse beams 4 and provided with the usual radiator 5. The gasoline tank 6 may be arranged at any suitable point on the frame. As shown, it is mounted on the front of the frame and secured thereto by means of straps 7. The engine shaft 8 is provided with the usual fly wheel 9, and the shaft may be extended forwardly of the engine, as at 10, and be provided with a pulley 11, whereby the power of the engine may be employed for stationary work, such as running sawmills, threshing machines, and the like.

The main shaft is provided with a bevel gear 12, adapted to mesh with either of two gears 13 mounted on a transverse shaft 14. By engaging either of the bevel gears 13, the shaft 14 may be driven in either direction. These gears are keyed to the shaft to permit longitudinal movement. As shown, the gears are connected by means of a sleeve 15 having a groove therein for the reception of the end of a clutch lever 16, which is pivoted to the frame, the free end of which is arranged adjacent the operator's seat 17. Sprockets 18 are arranged on each end of the shaft 14 and connected thereto by means of clutches 19, normally held in engagement by means of springs 20. These clutches are controlled by means of bell crank levers 21, pivotally mounted on brackets 22, secured to the frame of the machine and engaging operating levers 23. These levers are pivoted to the frame, as at 24, and are provided with pedals 25, on their free ends. By depressing either of the pedals, the bell crank lever will be swung in a clockwise direction to release the clutch 19 and disengage the corresponding sprocket 18 from the shaft.

The traction frames are formed of a pair of parallel spaced beams 26, spaced from the main frame, and secured thereto in any suitable manner. As shown, the traction frames and the main frame are connected by means of vertical beams 27 and diagonal bracing beams 28.

Suitable bearings 29 are arranged on the beams 26, and these bearings are adapted to receive shafts or axles 30, for the reception of wheels 31. As shown, one wheel is arranged at each end of each of the traction frames. The periphery of the wheel is provided with a plurality of lugs or projections 32, having depressions or recesses 33 formed therein. Between the lugs, the periphery of the wheel is depressed, as at 34. Each of the traction shoes, generally designated by the reference numeral 35, consists of a pair of spaced plates 36 and 37, connected to each other by webs 38 and 39. These members are pivotally connected to each other by means of bolts or pins 40, passing through openings 41 formed in ears 42 on the edges of the inner plate 36. As shown, one end of each plate is provided with a pair of ears arranged at each side, and the ears on the opposite end of the plate are disposed intermediate the ends. The edge of the plate is provided with projections 43, arranged opposite the ears of the next adjacent plate, and terminating at a point inwardly of the bolt or pin receiving openings 41. Between the ears 42 and the lugs 43, the surface of the plate is provided with cut-out portions or recesses 44. When the shoes are connected to each other, or assembled (see Figure 6), the ears 42 engage the outer ends of lugs 43 with the openings 41 arranged in alinement with each other for the reception of pins 40. The cut-out portions 44 provide notches or recesses for the reception of the lugs 32, formed on the periphery of the wheel, and the pins 40 enter the recesses 33 (see Figure 5). By means of this construction, a positive drive is obtained, as the power is transmitted to the shoe not only through the pin 40, but also through the engagement of the lug 32 with the shoes 35 when the lugs enter the cut-out portions 44.

Referring to Figure 5 of the drawings, it will be noted that the provision of the depressed surfaces 34 between the lugs 32 slightly spaces the shoe from the wheel and prevents injury to the shoe or the wheel, if dirt or other foreign matter passes under the shoe to the periphery of the wheel. The outer face of the shoe is provided with traction lugs 45, and with a lip or projection 46, extending outwardly therefrom and adapted to overlap the next shoe to prevent dirt, pebbles, or other foreign matter from entering the space between the shoes (see Figure 2).

A beam 47 is supported on each of the beams 26, and is provided with a plurality of bearings 48, for the reception of idler rollers 49. These rollers are adapted to engage the shoes of the traction element, when the shoes are in engagement with the ground, and they are preferably made of a width equal to the width of the shoes and provided with end flanges 50 (see Figure 7) to prevent lateral movement of the treads. Brackets 51 are supported on the beams 26 and provided with bearings 52 for the reception of a roller 53, similar in construction to the rollers 49. The roller 53 is provided to take up slack in the chain during its return flight, and any number of rollers may be employed for this purpose.

The cultivator frame 54, carrying cultivators 55, may be supported at the rear of each traction element. As shown, the cultivator frame is provided with forwardly extending arms 56, pivotally connected to the beams 26, as at 57. The cultivator may be controlled by means of a chain 58, secured to the cultivator frame, the opposite end thereof being connected to the end 59 of an operating lever. As shown, the lever is provided with a horizontal portion 60, mounted in suitable bearings 61, and provided with a handle or operating member 62. Suitably mounted on the tractor frame, at any desired point, are a plurality of clamps 63, whereby other agricultural units may be attached to the tractor for the purpose of preparing the soil for cultivation and harvesting crops. Various types of agricultural implements may be secured to the tractor frame in this manner, such as wheat drills, planters, mowing machines, corn harvesters, and other implements.

The rear wheels 31 of the traction elements are driven from the sprockets 18 by means of chains 18' passing over these sprockets, and over sprockets 19' formed on the wheels. By means of the clutches 19, either of the traction elements may be independently driven, as in turning. By depressing either of the pedals 25, the corresponding traction element is thrown out of gear to turn the tractor in the corresponding direction. The machine is driven forwardly or rearwardly by means of the bevel gears 13. Either of the gears may be connected to the gear 12 by moving sleeve 15.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A traction element comprising a pair of wheels, lugs arranged on the periphery of said wheels, an endless chain passing over said wheels, said chain comprising a plurality of links pivotally connected to each other, each of said links comprising inner and outer plates, and webs connecting said plates, said inner plates being provided with projecting ears at each end, said ears being provided with openings for the reception of pivot pins, and said inner plates being further provided with projections at each end arranged in alinement with the ears of the adjacent plate to space the edges of said plates and provide openings for the reception of said lugs.

2. A traction element comprising a pair of wheels, lugs arranged on the periphery of said wheels, an endless chain passing over said wheels, said chain comprising a plurality of links pivotally connected to each other, each of said links comprising inner and outer plates, and webs connecting said plates, said inner plates being provided with projecting ears at each end, said ears being provided with openings for the reception of pivot pins, said inner plates being further provided with projections at each end arranged in alinement with the ears of the adjacent plate to space the edges of said plates and provide openings for the repection of said lugs, and lips formed on the edges of said outer plates and adapted to overlap the edges of the outer plates of the adjacent links.

In testimony whereof I affix my signature in presence of two witnesses.

ROY C. SHELTON.

Witnesses:
 JNO. A. BOLLING,
 S. B. BRYAN.